Oct. 5, 1965   J. D. WATTS   3,210,098
TRANSITION JOINT
Filed July 27, 1961   2 Sheets-Sheet 1
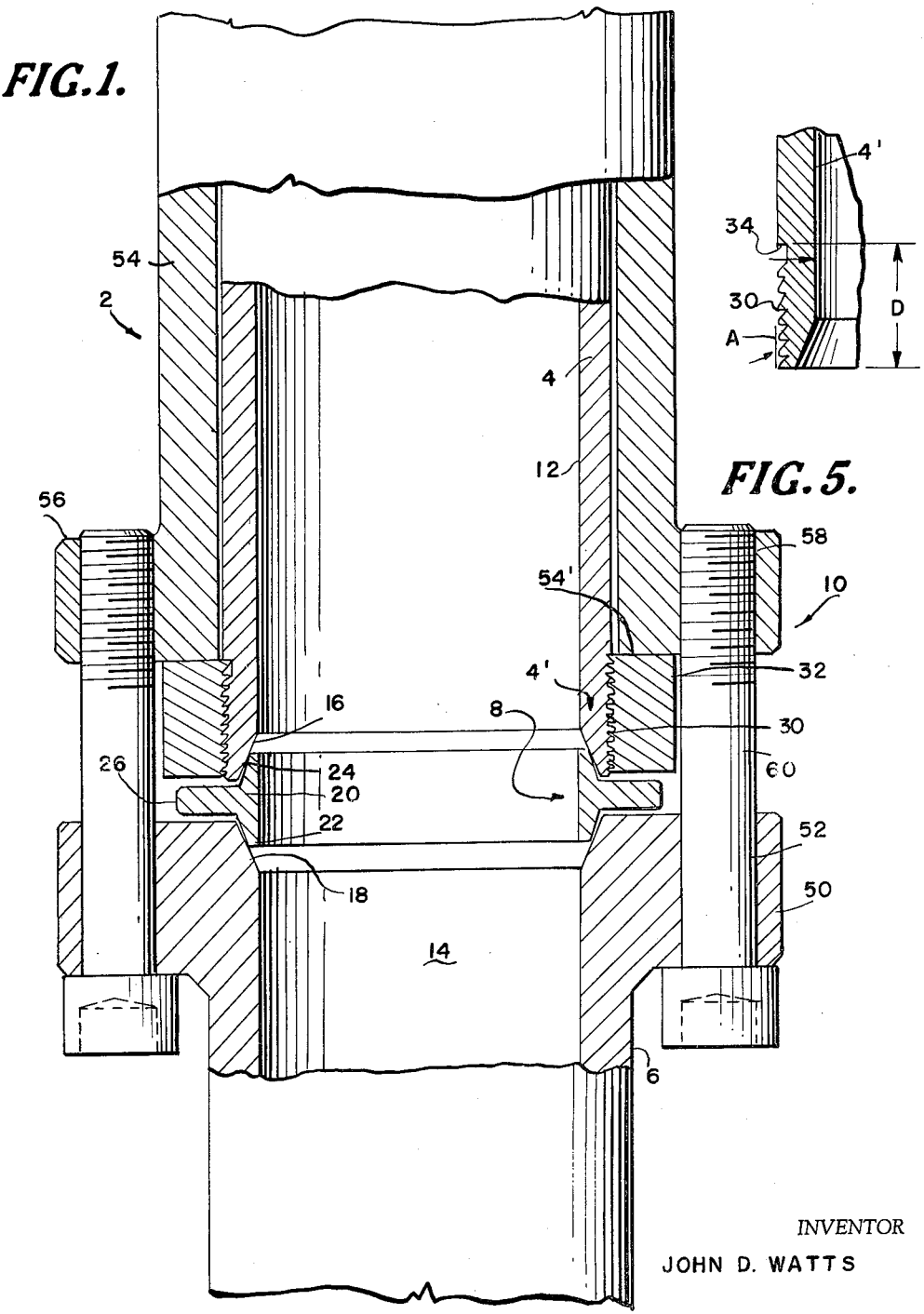
INVENTOR
JOHN D. WATTS
BY Cushman, Darby & Cushman
ATTORNEYS Oct. 5, 1965      J. D. WATTS      3,210,098
TRANSITION JOINT
Filed July 27, 1961      2 Sheets-Sheet 2
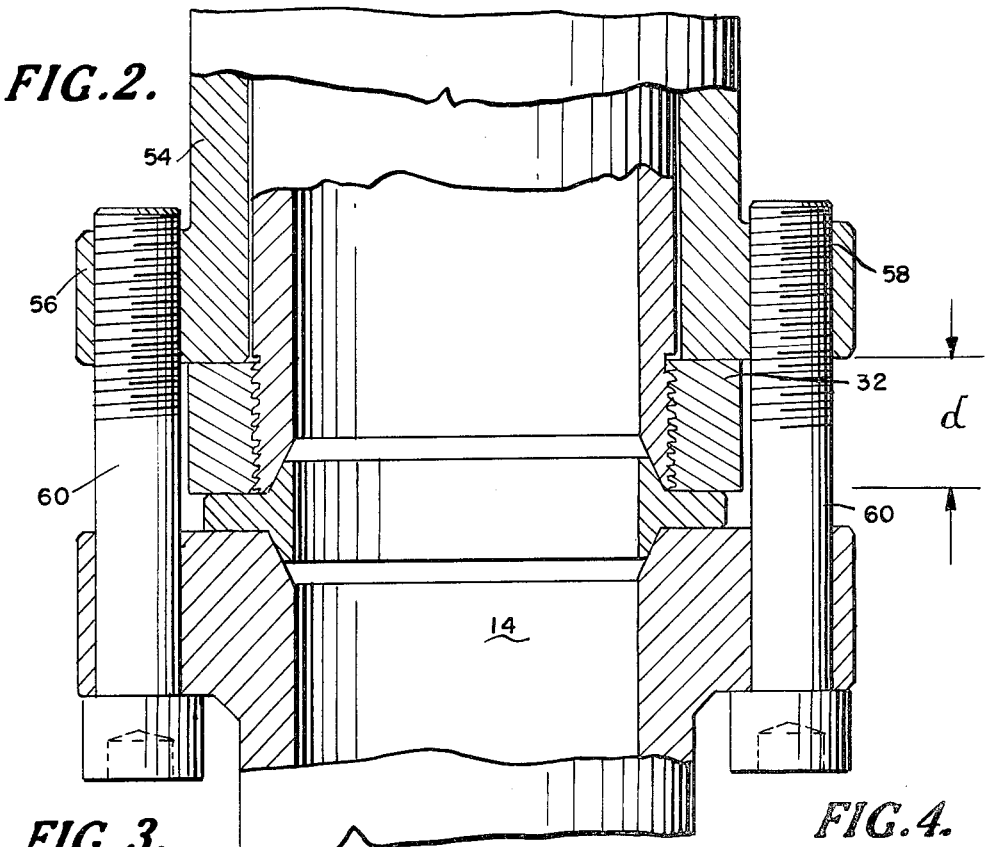
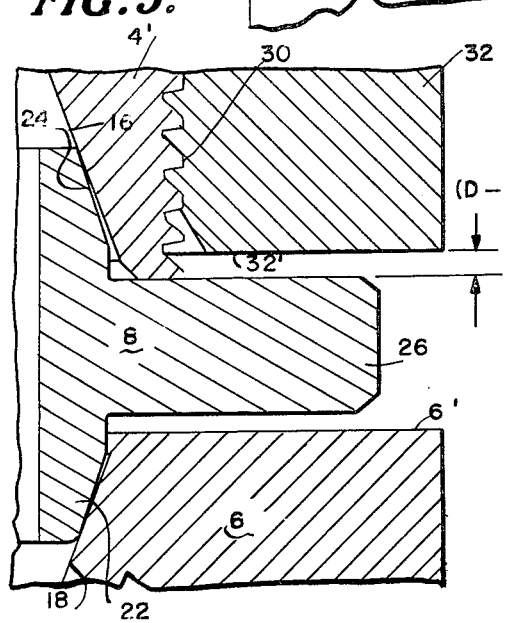
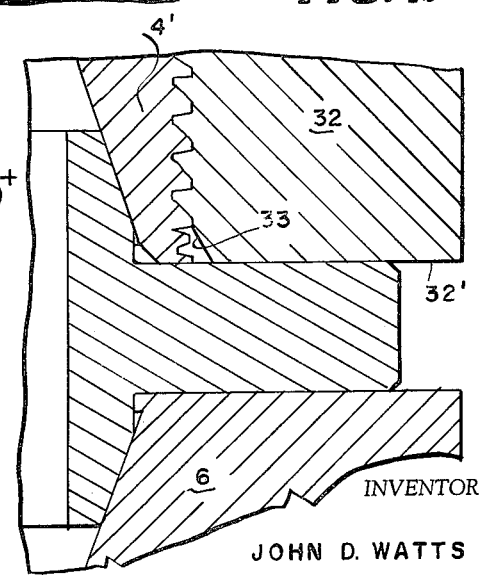
INVENTOR
JOHN D. WATTS
BY Cushman, Darby & Cushman
ATTORNEYS

United States Patent Office 3,210,098
Patented Oct. 5, 1965

3,210,098
TRANSITION JOINT
John D. Watts, Houston, Tex., assignor to Gray Tool Company, Houston, Tex., a corporation of Texas
Filed July 27, 1961, Ser. No. 127,373
13 Claims. (Cl. 285—173)

This invention relates to means for effecting a coupling between different conduit parts, and in particular, to methods and apparatus for joining conduit parts having different co-efficients of compressibility and thermal expansion so as to provide a fluid tight transition joint regardless of pressures and/or temperatures encountered under operating conditions.

As the term is used herein "coefficient of compressibility" has reference to the linear compression of a diameter or the like, i.e., the maximum unit linear deformation within the elastic range. Thus, the term corresponds to the ratio of the yield stress to the modulus of elasticity of the material.

In instances where extreme temperatures are encountered, and corrosive fluids are to be transferred from one location to another, it has been found desirable to form certain conduit sections from zirconium or its alloys or columbium or its alloys. At the same time, it has been found desirable to form other sections of the same conduit from a material such as, for example, carbon steel. Columbium, zirconium, and the alloys of either of these materials have substantially different moduli of elasticity, coefficients of compressibility, and coefficients of thermal expansion than carbon steel. Accordingly, when a conduit is provided which consists of different sections formed from such materials, a transition joint must be provided which effects a fluid tight coupling between the sections and compensates for the differing expansion characteristics with variations in temperature.

In addition to providing a transition joint which compensates for operational differential expansion, in certain instances as where substantial pressures are to be encountered within the operational conduit, it is desirable to provide a sealing ring, such as described in the United States Patent No. 2,766,829, within the transition joint and to form the respective cooperating end portions of the conduit sections whereby they receive and cooperate with such ring.

Accordingly, primary objects of the present invention are: (1) to provide a method of joining adjacent ends of separate conduit sections having different coefficients of expansion and compressibility with a seal ring therebetween to provide a fluid tight joint regardless of temperature variations of the joint components, and (2) to provide an improved coupling or transition joint between first and second conduit parts having different coefficients of thermal expansion and compressibility, which transition joint is so constructed as to compensate for operational differences in expansion between the respective conduit parts so as to effect a tight fluid seal regardless of operating temperatures, and which transition joint also incorporates a sealing ring such as that described in United States Patent No. 2,766,829 and possesses accordingly the advantages stated in such patent.

Still a further, yet more specific object of the present invention is to provide a transition joint adapted for use in coupling different conduit sections formed of the materials set forth above, and also adapted for use in coupling conduit sections formed of other materials possessing generally the same characteristics. More specifically, it is an object of this invention to provide a transition joint adapted to couple a conduit section formed of zirconium or its alloys, columbium or its alloys, stainless steel, titanium or its alloys, or tantalum with a conduit section formed of carbon steel, for example. It should be specifically understood that the invention is applicable in any instance where one conduit section has a different coefficient of thermal expansion and a different coefficient of compressibility or modulus of elasticity than another conduit section to which it is to be coupled.

Still further, yet even more specific objects of the present invention are: (a) to provide a transition joint conforming with all of the preceding objects, which transition joint can be formed comparatively inexpensively, and which transition joint can be assembled in accordance with standard mechanical techniques; (b) to provide such a transition joint wherein the difference in compressibility of the respective conduit sections is utilized for purposes of compensating for operational differential expansions encountered; (c) to provide such a transition joint wherein the respective conduit sections are secured together by means operating only indirectly on the more easily compressible and softer conduit section; (d) to provide such a transition joint wherein the components themselves can be, or are performed so as to insure against defective operation caused by applying forces during assembly which exceed the elastic limit of the components; and (e) to provide a method of coupling respective conduit sections having different characteristics of the above-described type, which method comprises a series of steps to be performed at ambient temperatures so as to provide for changes which take place at elevated temperatures.

In accordance with the method of the invention, separate conduit or pipe sections having different coefficients of expansion and compressibility are joined with a seal ring disposed therebetween to provide a fluid tight joint by placing the seal ring between the adjacent ends of the pipe sections to be joined, reenforcing and restricting the end portion of the one of the sections adjacent the seal which has the lower coefficient of compressibility, compressing such end portion of the one section adjacent the seal within the elastic limit thereof by an amount equal to at least the maximum differential thermal expansion within the joint occurring under operating conditions of the sections, and securing the sections together at ambient temperatures with the seal disposed therebetween and the one end portion compressed. Structurally, the transition joint provided by the instant invention includes first and second conduit parts to be joined, a sealing ring adapted to cooperate with the end surfaces of such parts, a sleeve carried on the section having the lower coefficient of compressibility, securing means for drawing the end surfaces toward one another with the sealing ring therebetween and so that the sleeve engages the sealing ring with the end of the one conduit part carrying the sleeve being compressed between the sleeve and the sealing ring.

The invention will be better understood, and objects other than those specifically set forth above will become apparent, when consideration is given to the following detailed description thereof. Such description refers to the accompanying drawings presenting the preferred and illustrative embodiments of the invention, and wherein:

FIGURE 1 is a side view, partially in section, of a transition joint constructed in accordance with the instant invention and presents the parts thereof as the same would appear during an initial assembly operation;

FIGURE 2 is a side view, partially in section, of the transition point shown in FIGURE 1, however, FIGURE 2 presents the parts thereof as the same would appear when assembly is completed;

FIGURE 3 is a fragmental detailed magnified sectional view presenting in exaggerated form the disposition of the respective joints components which cooperate with the sealing ring thereof as such components would appear in the partially assembled condition;

FIGURE 4 is a fragmental detailed magnified sectional view similar to FIGURE 3, but presenting the components directly cooperating with the sealing ring as the same would appear when assembly is completed; and FIGURE 5 is a fragmental detailed view of the lower end portion of the upper conduit part presented in FIGURES 1 and 2.

If reference is now made to FIGURE 1, it will be noted that the transition joint has been generally designated by the numeral 2, and that such joint comprises a first conduit part 4, a second conduit part 6, a sealing ring 8 disposed between the adjacent ends of the conduit parts 4 and 6, and securing means generally designated by the numeral 10 for joining the respective conduit parts together.

The conduit part 4 is a generally tubular member or pipe having the fluid passageway 12 therein, and the conduit part 6 is similarly a tubular member or pipe having the fluid passgeway 14 therein. The walls of fluid passageway 12 terminate in an outwardly flaring sealing surface 16, and the walls of fluid passageway 14 terminate in an outwardly flaring sealing surface 18.

The sealing ring 8 is provided for sealing the ends of the parts when they are drawn toward one another and is preferably constructed, as suggested above, in accordance with United States Patent No. 2,766,829 issued October 16, 1956. The sealing ring 8 comprises an inner annular flange portion 20 with oppositely disposed flexible lips 22 and 24, and an integral substantially centrally disposed external rib portion 26. The lips have exterior sealing surfaces which taper away from the rib portion and which are adapted to engage and seal with the outwardly flared sealing surfaces 16 and 18 on the respective conduit parts so as to reduce the area subject to pressure to a diameter substantially equal to that of the passageways 12 and 14. The rib portion 26 is of substantial thickness as compared with the lip portions 22 and 24 and has opposite faces which engage the end surfaces of the conduit parts 4 and 6 and limit the degree of movement of the parts toward one another.

It should be understood that the sealing ring 8 has been shown herein in generally its ultimate position, and that the flexible lips are shown as being bent inwardly from the normal position which they occupy when such sealing ring is not incorporated in a coupling. The particular construction and manner of operation of the sealing ring is adequately set forth in United States Patent No. 2,766,829, and if further information as to the construction or operation of the sealing ring is desired, reference should be had to such patent. However, the lip portions 22 and 24 are normally inclined to the longitudinal axis of the joint, a lesser angle than the sealing surfaces 16 and 18 so that upon deflection of the lips, the same are deflected into stressed sealing engagement with the adjacent sealing surfaces 16 and 18.

For purposes of the instant description, assume that the conduit part 4 is formed of Zircaloy-2 (a product of Westinghouse Corporation) which is a zirconium alloy, and that the conduit part 6 is formed of carbon steel. The parts may be formed of various other materials as outlined above, and accordingly this assumption is made primarily for purposes of facilitating comprehension of the invention.

The conduit part 4, if formed of a zirconium alloy, as assumed, would have a substantially lower coefficient of compressibility than the part 6 when formed of carbon steel. Moreover, the part 4 would have a substantially lower coefficient of thermal expansion than the part 6 under these conditions.

In accordance with the method of the invention, the difference in the coefficient of compressibility between the respective conduit parts is used to advantage to compensate for the differential thermal expansion therebetween. More specifically, the method of the invention provides for reenforcing and restricting the end portion of the conduit part 4 in this instance and compressing such end portion adjacent the seal ring 8 and within the elastic limit thereof by an amount equal to at least the maximum differential thermal expansion within the joint occurring under operating conditions.

Preferably, such method steps are achived in accordance with the invention by providing the lower end portion 4' of the part 4 with peripheral threads 30 and by incorporating a sleeve member 32 having internal threads adapted to cooperate with the threads 30 whereby the sleeve can be screwed onto the end portion 4' so as to threadably engage and surround the periphery thereof.

The sleeve member 32, as shown in FIGURE 2, has an axial length $d$. The lower end portion 4' of the conduit part 4, as shown in FIGURE 5 is preferably provided with a shoulder 34 which is spaced from the lower edge of the part by a distance D. The threads 30 extend generally from the shoulder 34 to the lower edge of the part 4. The axial length of the sleeve 32 is less than the distance D, and thus when the sleeve member 32 is threaded onto the lower end portion 4' of the conduit part 4, the lower end of the sleeve is spaced from the lower end of the conduit part by a distance equal to $(D-d)$. It is assumed at this stage of the description that the parts are being assembled at ambient temperatures and are not being subjected to elevated operating temperatures. Thus, in the normal condition of the conduit part 4, the sleeve 32 circumferentially surrounds and threadably engages the lower end portion 4' of the conduit part 4 and the lower extremity of the conduit 4 projects beyond and terminates in spaced relation to the lower extremity of the sleeve 32.

The sleeve 32 and end portion 4' of the conduit part 4 may threadably cooperate in any suitable manner, and the flank angle of the thread generally designated by the letter A (FIGURE 5) may be varied to suit particular conditions. The angle A is adjusted so as to provide for a specific radial compression commensurate with the differential expansion anticipated, as explained in more detail below.

In order to secure the parts in the desired related assembly, the conduit part 6 is provided with a laterally projected flange 50 having suitable apertures 52 therein. The conduit part 4, on the contrary, is not provided with any laterally projecting coupling flange. Instead, an auxiliary coupling sleeve 54 is incorporated. The sleeve 54 is adapted to circumferentially surround the conduit part 4 at least adjacent the end portion thereof, and such sleeve itself carries a laterally projecting flange 56 having threaded apertures 58 therein. The apertures 58 are so located in the flange 56 as to be alignable with the apertures 52 in the flange 50. The base 54' of the auxiliary sleeve 54 bears against the top end of the sleeve member 32 when the parts are assembled, as shown in FIGURE 1, and bolts such as those designated by numerals 60 have their shanks extending through the apertures 52 with the threads thereon cooperating with the threaded apertures 58 so as to permit, upon tightening of the bolts, drawing of the respective flanges 50 and 56 toward one another, and resultant coupling of the parts in fixed assembly.

When the parts are first assembled, and the bolts 60 are hand-tightened, the parts of the joint adjacent the sealing ring 8 assume respective positions as shown in FIGURE 3. The sealing ring 8 has its lips 22 and 24 contacting and cooperating with the outwardly flared end sealing surfaces 18 and 16 respectively of the conduit parts. The lower end of the conduit 4' engages the top face of the rib 26 of the sealing ring, and the sleeve member 32 has its lower end spaced from the top surface of such rib.

After the initial assembly, the parts are moved closer together by further tightening of the bolts 60. Initially, the top edge 6' of the part 6 contacts the lower face of the rib 26 of the sealing ring 8. With further tightening, the lower end portion 4' of conduit part 6 is compressed and the lower edge 32' of sleeve 32 engages the top face of rib 26 of the sealing ring 8.

It will be remembered that the conduit part 4 has a lower coefficient of compressibility than the conduit part 6. Similarly, in accordance with the invention, the coefficient of compressibility of the conduit part 4 is less than the coefficient of compressibility of the sleeve 32. It is by virtue of these differences that the conduit part 4 is compressed when tightening of the bolts 60 proceeds so that the components ultimately assume the position shown in FIGURE 4.

The sleeve 32 may be provided with a flared lower extremity 33. By virtue of the compression which is obtained in the manner explained above, the sealing surface 16 of the conduit part 4 is reduced in diameter. Accordingly, initially, before the conduit part 4 is in any way compressed, the sealing surface 16 thereof has a diameter at any given distance from the edge thereof which is slightly larger than the corresponding diameter of the sealing surface 18. During the compression, however, the sealing surfaces 16 and 18 assume the same diameter so that the sealing ring 8 properly cooperates with both of such members. The normal differential distance $(D-d)$ between the lower extremity of the sleeve 32 and the uncompressed lower extremity of the conduit part 4 and the flank angle A of the threads 30 is adjusted so that the compression of the conduit part 4 is sufficient to compensate for any differential expansion caused within the joint during operation thereof.

It has been found that with Zircaloy conduit parts having a wall thickness of approximately .5 inch and a mean diameter of approximately 3 inches and carbon steel conduit sections having the same general dimensions, a suitable transition joint can be obtained when the distance $(D-d)$ is of the order of .01 inch and the flank angle of the threads 30 is of the order of 40°. These dimensions are merely exemplary for a particular situation and it will be appreciated by those of ordinary skill in the art that the flank angle can be suitably adjusted, and that the distance $(D-d)$ can also be suitably adjusted so as to provide for an adequate compression which is at least as great, and preferably slightly greater than that necessary to compensate for maximum differentianl expansion within the joint. Of course, with changing conditions, the particular difference in diameter between the sealing surface 16 and the sealing surface 18 as initially constructed would also be suitably altered.

While not specifically set forth above, it is important to understand that an essential aspect of the invention is that the conduit part 4 not be compressed beyond the elastic limit thereof. It is the very elasticity of such component which serves to compensate for the differential expansion within the joint, and thus the elastic limit cannot be exceeded.

While it has been stated that the amount of compression is at least as great as the differential expansion to be encountered, preferably the amount of compression is greater than the differential expansion so as to insure proper sealing contact of all surfaces in operation with a margin of safety.

In addition to the foregoing, it should be understood that one of the important aspects of the invention is the manner in which the component conduit part 4 is secured to the conduit part 6. This is achieved, as suggested above, by not directly coupling the conduit part 4 with the conduit part 6, but instead by utilizing the auxiliary sleeve 54 which bears on the sleeve member 32 so as to fix the parts in assembled condition. There is no direct application of force from the securing means to the conduit part 4, but instead the direct application is to the sleeve member 32 which in turn, through the threads 30, transmits such force to the part 4. With this construction, no injury is caused to the part 4 notwithstanding the relatively "soft" nature thereof.

One additional advantage obtained with the instant invention lies in the manner in which the lip 24 of the ring 8 seats. As opposed to the lip 24 moving inwardly in ultimate tightening of the assembly, which may result in galling of the sealing surface 16, with the instant construction, during the final assembly, the part 4 is compressed and the sealing surface 16 actually moves inwardly. Thus, the normal relative movement of the lip during the assembly is virtually eliminated and the tendency of the ring lip to injure the soft material is overcome. This same advantage is obtained when materials other than Zircaloy are used but which have generally the same characteristics, and it will be remembered that the component 4 has merely been assumed to be made of Zircaloy to facilitate the description.

After reading the foregoing detailed discussion of the illustrative and preferred embodiments of the invention, it should be apparent that the objects set forth at the outset of this specification have been successfully achieved. Various modifications other than those specifically suggested may occur to those of ordinary skill in the art, which modifications do not depart from the scope and spirit of the invention.

Accordingly,
What is claimed is:

1. In a transition joint comprising first and second conduit parts having end surfaces presented toward one another, a sealing ring adapted to cooperate with said end surfaces, and securing means for drawing said end surfaces toward one another with said sealing ring therebetween, wherein one of said conduit parts has a lower coefficient of compressibility and different coefficient of thermal expansion than the other, the improvement comprising a circumferential sleeve threadably engaging and surrounding the periphery of said one conduit part adjacent said surface thereof, said sleeve terminating a distance inwardly of the end edge of said one conduit part in the normal condition thereof sufficient to compensate for differential expansion created in the joint during operation thereof, said sleeve having a higher coefficient of compressibility than said one conduit part, said securing means cooperating with said other conduit part and said sleeve to fix said parts together with said sleeve engaging said sealing ring and the end portion of said one part adjacent said sealing ring compressed between said sealing ring and said sleeve.

2. The improvement defined in claim 1 wherein said sleeve is outwardly flared adjacent the radially inner lower edge thereof adapted to engage said seal ring.

3. A high pressure coupling comprising first and second conduit parts having end surfaces presented toward one another, one of said conduit parts having a lower coefficient of compressibility and different coefficient of thermal expansion than the other, each of said conduit parts having aligned fluid passages therein the walls of which terminate in outwardly flaring sealing surfaces adjacent said end surfaces of said parts, a unitary sealing ring for sealing the ends of said parts when they are drawn toward one another, said sealing ring comprising an inner annular flange portion with oppositely disposed flexible lips and an integral substantially centrally disposed external rib portion, said lips having exterior sealing surfaces which normally taper away from said rib portion a lesser angle relative to the longitudinal axis of the coupling than the adjacent sealing surface on said conduit parts and which are operative for deflection into stressed sealing engagement with said flared sealing surfaces on said conduit parts, the ring being adapted to reduce the area subject to pressure to a diameter substantially equal to that of said passages, said rib portion being of substantial thickness as compared with said lip portions and having opposite faces which engage the end surfaces of said conduit parts and limit the degree of movement of said parts toward one another, said one conduit part having a threaded outer end portion terminating in a shoulder spaced from the end edge thereof adapted to engage said sealing ring a distance sufficient to compensate for differential expansion created in the joint during operation thereof, a sleeve threaded on said end portion, said sleeve having a higher coefficient of compressibility than said one pipe section, said sleeve being shorter than said end portion in the uncompressed condition thereof whereby when said sleeve is threaded on said end portion, one end thereof engages said shoulder and the other end thereof is spaced from said end edge of said one conduit part, and securing means cooperating only with the other conduit part and said sleeve for fixing said conduit parts together with said sealing ring therebetween and with said end portion of said one conduit part compressed whereby the sealing surface of said one conduit part is moved radially inwardly into stressed sealing engagement with the exterior sealing surface of said lip and said sleeve engages said sealing ring.

4. A high pressure coupling as defined in claim 3 wherein said conduit parts are cylindrical and wherein the diameter of the sealing surface of said one conduit part at the terminus of said part is normally greater than the diameter of the sealing surface of said other conduit part at the terminus of said part by an amount at least substantially equal to the amount of radial inward movement of the sealing surface of said one conduit part existent when said conduit parts are fixed together at ambient temperature.

5. A high pressure coupling as defined in claim 4 wherein said securing means comprises a flange projecting laterally of said other conduit part and having a plurality of apertures therein, a securing sleeve adapted to partially encase said one conduit part and engage said first-mentioned sleeve, said securing sleeve having a flange projecting laterally thereof with apertures therein adapted to be aligned with said first-mentioned apertures, and bolt means adapted to pass through said apertures to draw said flanges toward one another.

6. A high pressure coupling comprising first and second conduit parts, one of said conduit parts having a lower coefficient of compressibility and a different coefficient of thermal expansion than the other, each of said conduit parts having aligned fluid passages therein, circumferential sleeve means engaging and surrounding the periphery of said one conduit part adjacent the terminus of said part, said sleeve means terminating a distance inwardly of the end edge of said one conduit part in the normal condition thereof sufficient to compensate for any differential expansion within the elastic limit of said one conduit caused by the joint during operation thereof, said sleeve means having a higher coefficient of compressibility than said one conduit part, and securing means cooperating with said other conduit part and said sleeve means to fix said parts together, said one part being compressed said distance.

7. A method of joining adjacent ends of separate pipe sections having radial end faces presented toward one another and having different coefficients of expansion and compressibility with a seal ring therebetween to provide a fluid tight joint regardless of temperature variations of the joint components, which method comprises the steps of placing a seal ring between the adjacent ends of the pipe sections to be joined, reenforcing and radially restricting the end portion of one of said sections adjacent said seal which has the lower coefficient of compressibility, providing the terminal portion of said end portion to extend beyond the reinforced and restrained portion a distance at least equal to the maximum differential thermal expansion within the joint at its operating temperature, axially compressing said end portion of said extending terminal one section by directing an axial force against the radial end face of said one section adjacent said seal without exceeding the elastic limit thereof by an amount equal to at least the maximum differential thermal expansion within said joint occurring under operating conditions of the sections, and securing said sections together with said seal therebetween and said one end portion compressed.

8. A method of joining adjacent ends of separate pipe sections having different coefficients of expansion and compressibility to provide a fluid-tight joint regardless of temperature variations of the joint components, which method comprises the steps of reinforcing and radially restricting the pipe section region closely adjacent the end portion of said section which has the lower coefficient of compressibility, providing the terminal portion of said end portion to extend beyond the reinforced and restrained portion a distance at least equal to the maximum differential thermal expansion within the joint at its operating temperature, axially compressing said extending terminal end portion of said one section within the elastic limit thereof by an amount equal to at least the maximum differential thermal expansion within said joint occurring under operating conditions of the sections by directing an axial force against a radial end face of said one section, and securing said sections together at ambient temperature with said end portion so compressed.

9. In making up a fluid tight joint between a first and a second tubular member having different coefficients of thermal expansion wherein the joint is adapted for use between a higher temperature and a lower temperature, a method for prestressing the terminal region of the first member having the lower coefficient of thermal expansion by a predetermined amount that is less than the yield stress of said member at the lower temperature, but large enough to substantially compensate for difference in thermal expansion of the joint members at the higher temperature comprising: forming an annular outwardly flaring sealing surface on the interior of the first member extending to a radial end face end of said first member; positioning a member carrying a tapered annular sealing surface cooperable with the first member sealing surface so that the sealing surface of said member is located radially inwardly of the first member sealing surface; directing an axial compressional force on the radial end face of said first member while circumferentially restraining the terminal region of the first member so as to substantially prevent radially outward movement thereof and thereby radially inwardly moving the outwardly flaring sealing surface on the interior of the first tubular member into stressed sealing engagement with the second mentioned annular sealing surface.

10. A method as set forth in claim 9 additionally including: coupling the first tubular member having an end region so stressed and sealed, to a second tubular member so as to align the throughbores of the two tubular members and provide a fluid tight joint therebetween.

11. A method as set forth in claim 9 including restraining radially outward movement of the terminal region of the first tubular member during axial compression thereof by: providing a stop on the exterior surface of the first tubular member spaced inwardly from the sealing surface carrying end thereof; gauging the distance between the stop and said first tubular member end and choosing an annular circumferentially radial expansion restraining member circumferentially engageable with the first tubular member terminal region and having an axial length shorter than said gauged distance by an amount defining the amount of material adjacent said first tubular member end which is to be moved axially upwardly and radially inwardly to provide the stressed sealing engagement of the first tubular member sealing surface with second mentioned annular sealing surface; threading the annular expansion restraining member onto said first tubular member terminal region until it abuts said stop; and wherein the axially upwardly directed force is applied to the end of said first tubular member moving said axially with respect to the adjacent end of said expansion restraining member until the just mentioned ends of said members are substantially flush.

12. A method of making a joint between two tubular members having different coefficients of thermal expansion wherein the joint is adapted to be employed at an elevated operating temperature comprising: selecting a first tubular member having a lower coefficient of thermal expansion; selecting a second tubular member having a higher coefficient of thermal expansion; forming an annular outwardly flaring sealing surface on the inner surface of each tubular member at an end of each member, axially aligning the throughbores of the tubular members and interposing a sealing ring between them arranged to extend at least a short distance into the throughbores and arranged to seal with each of said sealing surfaces and having a portion extending radially outwardly between the adjacent end of the tubular members; positioning an annular reinforcing member on said first tubular member in circumferentially engaging relationship with the terminal region thereof so as to substantially limit outward radial expansion of the end region of the first tubular member; providing a short portion of the terminal region of the first tubular member to extend beyond the end of said reinforcing member which is nearest the terminus of the first tubular member; including enough material in said last mentioned portion to approximately equal the difference in thermal expansion of the terminal regions of tubular members when they are raised to said elevated operating temperature; and drawing said tubular members axially toward one another a distance such that said reinforcing member end abuts the sealing ring radially outwardly extending portion thereby axially compressing the first tubular member terminal region short portion against said sealing ring outwardly extending portion until the end of the first tubular member is substantially even with said reinforcing member end and the sealing surface on said first tubular member is moved radially inwardly into stressed sealing engagement with said sealing ring.

13. A method as set forth in claim 12 additionally including: forming threads on the exterior of the terminal region of said first tubular member and a stop at the axially inner end of the threaded region; forming cooperating threads on the interior of said reinforcing member whereby the last-mentioned member is accurately positioned on and secured to said first tubular member by threading it onto said member until it reaches said stop.

References Cited by the Examiner

UNITED STATES PATENTS

| | | | |
|---|---|---|---|
| 648,232 | 4/00 | Brandt | 285—414 |
| 680,649 | 8/01 | Crombie | 285—334.3 |
| 1,819,036 | 8/31 | Oberhuber. | |
| 1,821,867 | 9/31 | Wilson. | |
| 1,936,420 | 11/33 | Bailey | 285—363 |
| 2,239,942 | 4/41 | Stone et al. | 285—334.4 |
| 2,695,184 | 11/54 | Hobbs | 285—187 |
| 2,766,829 | 10/56 | Watts | 285—140 |

OTHER REFERENCES

Mechanical Engineers Handbook, pp. 624 and 625.

CARL W. TOMLIN, *Primary Examiner.*